Patented Sept. 11, 1934

1,973,489

UNITED STATES PATENT OFFICE 1,973,489

COMPOSITION OF MATTER CONTAINING CELLULOSE ACETATE AND A TREATED NATURAL RESIN OR GUM

Neil S. Kocher, Rochester, N. Y., assignor to Eastman Kodak Company, Rochester, N. Y., a corporation of New York No Drawing. Application December 20, 1930, Serial No. 503,766

4 Claims. (Cl. 134—79)

This invention relates to compositions of matter containing cellulose acetate and a gum or resin, and more particularly to lacquers which include in their composition cellulose acetate and a natural gum which has been treated in such a way as to make it compatible with the cellulose acetate, for instance when the gum or resin has been treated with nitric acid.

Gums and resins have been frequently incorporated in lacquer compositions heretofore, but with only varied degrees of success for the reason that it has been difficult to discover a resin or gum which would be compatible with the cellulose acetate and such plasticizers as are commonly employed.

Although efforts have been made to incorporate in cellulose acetate lacquers such gums as congo, manilla or kauri gums, or even the ordinary kinds of resins, such efforts have met with little or no success for the reason that even through it is possible to form a compatible solution with these gums and cellulose acetate in the usual solvents therefor, the resulting solution will produce a coating which is hazy, or entirely opaque, due to the separation of the gum and acetate when dry.

I have discovered for instance that the gum or resin can be made compatible merely by giving to it a short nitric acid treatment. I first pulverize the gum or resin and then add it slowly with agitation to a 30% solution of nitric acid the mixture being agitated and maintained at a temperature of approximately 80° C. for a period of about 24 hours. Obviously the pulverizing of the gum or resin is merely for the purpose of making the nitric acid more accessible to the gum. The strength of nitric acid employed in treating the gum is not confined to 30% as it may vary over a considerable range, for instance, I may employ nitric acid as low as 20 to 25% concentration or may employ acid having a strength of from 40 to 50%. Obviously with the stronger acid a shorter period of treatment may be employed if desired.

While I do not wish to commit myself as to any particular theory of what occurs by the nitric acid treatment, I may state that very little, if any, nitration of the gum takes place as upon the analysis of a treated gum which has been carefully washed, very little, if any, nitrogen is found to be present. Obviously if the gum were to be treated with strong nitric acid or with fuming nitric acid, some nitration of the gum might occur. However, I have found that the gums which are treated with nitric acid of a strength of approximately 50% or lower are more satisfactory as a lacquer resin than those which have been treated with concentrated or fuming nitric acid which results in a partial nitration of the gum or resin.

A suitable cellulose acetate lacquer employing this type of resin in its composition may comprise approximately 20 ounces of acetone soluble cellulose acetate of low viscosity such as, for instance, in the range of 2 to 125 seconds when such viscosity is determined by taking the time in seconds required for a $\frac{1}{16}''$ steel ball to fall through $10''$ of solution at 20° C., the solution being made by dissolving 1 part of the dry cellulose acetate in 4 parts of acetone. The cellulose acetate may be dissolved in approximately one gallon of a solvent mixture composed of about 25% ethyl acetate, 30% acetone, 25% ethyl lactate and 20% ethyl alcohol. To this may then be added approximately 8 to 18 ounces of a suitable plasticizer such, for instance, as tri-cresyl-phosphate, diethyl-phthalate, or tri-acetin. Into this solution is then incorporated from approximately 1 to 20 ounces of a gum or resin treated in accordance with the process above described as the preferred process; congo, manilla, kauri, which substantially constitute the class known as copal resins or the other known natural gums or resins, which have been treated with nitric acid in accordance with my invention are all suitable. After complete solution has taken place the lacquer is then ready to be employed in the same manner as any other cellulose derivative lacquer, either by spraying, brushing or dipping, all as well known to those skilled in the art.

It will be apparent that the amount of resin employed will determine somewhat the viscosity or consistency of the lacquer and that when a small amount of resin is employed the lacquer will be thinner or more freely flowing than when a large proportion of resin is employed.

Numerous other changes will occur to those skilled in the art, but it will be understood that these come within the scope of my invention and the claims appended hereto so long as the principle of my invention is employed, namely, the treatment of a resin or gum with comparatively weak nitric acid or the use of such resin in the compounding of lacquers. In the claims where I refer to aqueous solutions of nitric acid I intend to include any concentration of nitric acid weaker than concentrated nitric acid itself.

What I claim as my invention and desire to be secured by Letters Patent of the United States is:

1. A composition of matter comprising cellulose acetate and a copal resin which has been heated with nitric acid of 20% to 50% concentration.

2. A composition of matter comprising cellulose acetate and a copal resin which has been heated with an aqueous solution of nitric acid of 20% to 50% concentration.

3. A coating composition capable of forming clear films, comprising cellulose acetate and a copal resin which has been heated with an aqueous solution of nitric acid of 20% to 50% concentration.

4. A coating composition comprising cellulose acetate, a solvent mixture, a plasticizer, and a copal resin which has been heated with an aqueous solution of nitric acid of 20% to 50% concentration.

NEIL S. KOCHER.